(12) United States Patent
Thyagarajan et al.

(10) Patent No.: US 8,595,393 B2
(45) Date of Patent: Nov. 26, 2013

(54) MESSAGE FLOW REROUTING FOR SELF-DISRUPTING NETWORK ELEMENT

(75) Inventors: Manikka Thyagarajan, Ottawa (CA); Michael H. Lashley, Chateauguay (CA); Suat R. Eskicioglu, Ottawa (CA); Csaba Marton, Ottawa (CA); Nausheen Naz, Ottawa (CA)

(73) Assignee: Alcatel Lucent, Paris (FR)

( * ) Notice: Subject to any disclaimer, the term of this patent is extended or adjusted under 35 U.S.C. 154(b) by 270 days.

(21) Appl. No.: 13/149,473

(22) Filed: May 31, 2011

(65) Prior Publication Data

US 2012/0311205 A1 Dec. 6, 2012

(51) Int. Cl.
*G06F 3/00* (2006.01)
*G06F 11/00* (2006.01)

(52) U.S. Cl.
USPC .............................. 710/54; 370/241

(58) Field of Classification Search
None
See application file for complete search history.

(56) References Cited

U.S. PATENT DOCUMENTS

2007/0081467 A1* 4/2007 Hurst et al. ............... 370/248
2011/0305150 A1* 12/2011 Haver et al. .............. 370/252

* cited by examiner

*Primary Examiner* — Idriss N Alrobaye
*Assistant Examiner* — Richard B Franklin
(74) *Attorney, Agent, or Firm* — Kramer & Amado P.C.

(57) ABSTRACT

A method, apparatus, and machine readable storage medium is disclosed for establishing a test protocol processor which intercepts success path protocol messages at a network element port buffer and substitutes a failure path message to simulate the introduction of unexpected protocol messages into the protocol message flow from an external source to the network element under test. The disclosed self disrupting network element is particularly useful for providing a means to perform in situ field testing of a network element.

18 Claims, 4 Drawing Sheets

MESSAGE FLOW REROUTING FOR SELF-DISRUPTING NETWORK ELEMENT

CROSS-REFERENCE

This application cross-references the following co-pending application, incorporated by reference herein: application Ser. No. 13/149,514, "MESSAGE FLOW REROUTING FOR AUTONOMOUS SELF-DISRUPTING NETWORK ELEMENT" to Thyagarajan et al.

This application cross-references the following co-pending application, incorporated by reference herein: application Ser. No. 13/149,370, "AUTONOMOUS SELF-DISRUPTING NETWORK ELEMENT" to Naz et al., filed May 31, 2011.

This application cross-references the following co-pending application, incorporated by reference herein: application Ser. No. 13/149,414, "SELF-DISRUPTING NETWORK ELEMENT" to Naz et al., filed May 31, 2011.

This application cross-references the following co-pending application, incorporated by reference herein: application Ser. No. 13/149,316, "FIELD-DEPLOYABLE PROTOCOL MESSAGE INTERCEPTOR" to Thyagarajan et al., filed May 31, 2011.

This application cross-references the following co-pending application, incorporated by reference herein: application Ser. No. 13/149,556, "FIELD-DEPLOYABLE MESSAGE COMPROMISER" to Naz et al., filed May 31, 2011.

FIELD OF THE INVENTION

The invention relates to generally to network element equipment testing and is particularly concerned with substituting success path protocol messages with failure path protocol messages.

BACKGROUND OF THE INVENTION

As demand increases for varying types of applications within mobile telecommunications networks, service providers constantly upgrade their systems in order to reliably provide an expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks. As seen in second and third generation networks, voice services must be carried over dedicated voice channels and directed toward a circuit-switched core, while other service communications are transmitted according to the internet protocol (IP) and directed toward a different, packet-switched core. This led to unique problems regarding application provision, metering and charging, and quality of experience (QoE) assurance.

Call drops and call establishment failures are two of the major issues in wireless networks that impact end user experience and cause customer dissatisfaction. As such telecommunication systems become more complex, testing and verification of such systems also increases in complexity. In particular, more test cases are required to exercise various protocol message flows, such as for example, the flow of protocol messages between network elements to establish a call or establish a service between those elements, and in particular, various possible combinations of protocol message sequence that might occur in a real world situation. Thus it is important to be able to test the robustness of network elements to determine if the network elements can gracefully handle receiving incongruous, unexpected or invalid protocol messages. Typical protocol generators used in network test systems only generate protocol compliant messages producing success path responses to protocol messages received from network equipment (network element) under test.

In view of the foregoing, it would be desirable to provide a method to easily introduce failure scenarios in protocol message flows of protocol message based communications systems.

SUMMARY OF THE INVENTION

According to one aspect of the invention there is disclosed a network element comprising: a port having a port buffer; a standard protocol processor which processes messages stored in the port buffer; and a test protocol processor having access to the port buffer; wherein the test protocol processor is configured to: remove a first protocol message at the port buffer; and substitute the first protocol message with a corresponding failure path protocol message.

In some embodiments of the invention the failure path protocol message diverts protocol message flow from a prescribed success path message flow.

In some embodiments of the invention the substitute step comprises steps of: removing the first protocol message from said port buffer; and replacing the first protocol message in the port buffer with a corresponding failure path protocol message after a time delay.

In some embodiments of the invention the test protocol processor substitutes the first protocol message in the port buffer after altering the payload contents of the failure path protocol message.

In some embodiments of the invention the protocol messages comprise Universal Mobile Telecommunications System (UMTS) protocol messages.

In some embodiments of the invention the port buffer comprises an input port buffer of the network element; and the test protocol processor substitutes the first protocol message prior to the standard protocol processor processing the first protocol message.

In other embodiments of the invention the port buffer comprises an output port buffer of the network element and the test protocol processor substitutes said first protocol message prior to transmission of the failure path protocol message from the port.

According to another aspect of the invention there is provided a method performed by a test protocol processor in a network element having a port buffer; a standard protocol processor which processes messages stored in the port buffer, the test protocol processor having access to the port buffer. The method comprises steps of: removing a first protocol message at the port buffer; and substituting the protocol message with a corresponding failure path protocol message.

In some embodiments of the invention the failure path protocol message diverts protocol message flow from a prescribed success path message flow.

In some embodiments of the invention the substitute step comprises steps of: removing the first protocol message from said port buffer; and replacing the first protocol message in the port buffer with a corresponding failure path protocol message after a time delay.

In some embodiments of the invention the test protocol processor substitutes the first protocol message in the port buffer after altering the payload contents of the failure path protocol message.

According to another embodiment of the invention there is provided a tangible and non-transitory machine-readable storage medium encoded with instructions thereon for execution by a test protocol processor on a port buffer of a telecommunication network element having a standard protocol processor, wherein the instructions adapt the operation of the test protocol processor to perform a method; the method comprising steps of: removing a first protocol message at the port buffer; and substituting the protocol message with a corresponding failure path protocol message.

In some embodiments of the invention the instructions configure the operation of the test protocol processor such that the failure path protocol message diverts protocol message handling at the standard protocol processor from a prescribed success path message flow.

In some embodiments of the invention the instructions configure the operation of the test protocol processor such that the substitute step comprises steps of: removing the first protocol message from said port buffer; and replacing the first protocol message in the port buffer with a corresponding failure path protocol message after a time delay.

In some embodiments of the invention the instructions configure the operation of the test protocol processor such that the test protocol processor substitutes the first protocol message in the port buffer after altering the payload contents of the failure path protocol message.

In some embodiments of the invention the instructions configure the operation of the test protocol processor such that the protocol messages comprise Universal Mobile Telecommunications System (UMTS) protocol messages.

In some embodiments of the invention the port buffer comprises an input port buffer of the network element; and the instructions configure the operation of the test protocol processor such that the test protocol processor removes the first protocol message prior to the standard protocol processor processing the message.

In some embodiments of the invention the port buffer comprises an output port buffer of the network element and the instructions configure the operation of the test protocol processor such that the test protocol processor removes the first protocol message prior to transmission of the failure path protocol message from the port.

Note: the following description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which.

DETAILED DESCRIPTION

Referring now to the drawings, in which like numerals refer to like components or steps, there are disclosed broad aspects of various exemplary embodiments.

Figure 1:
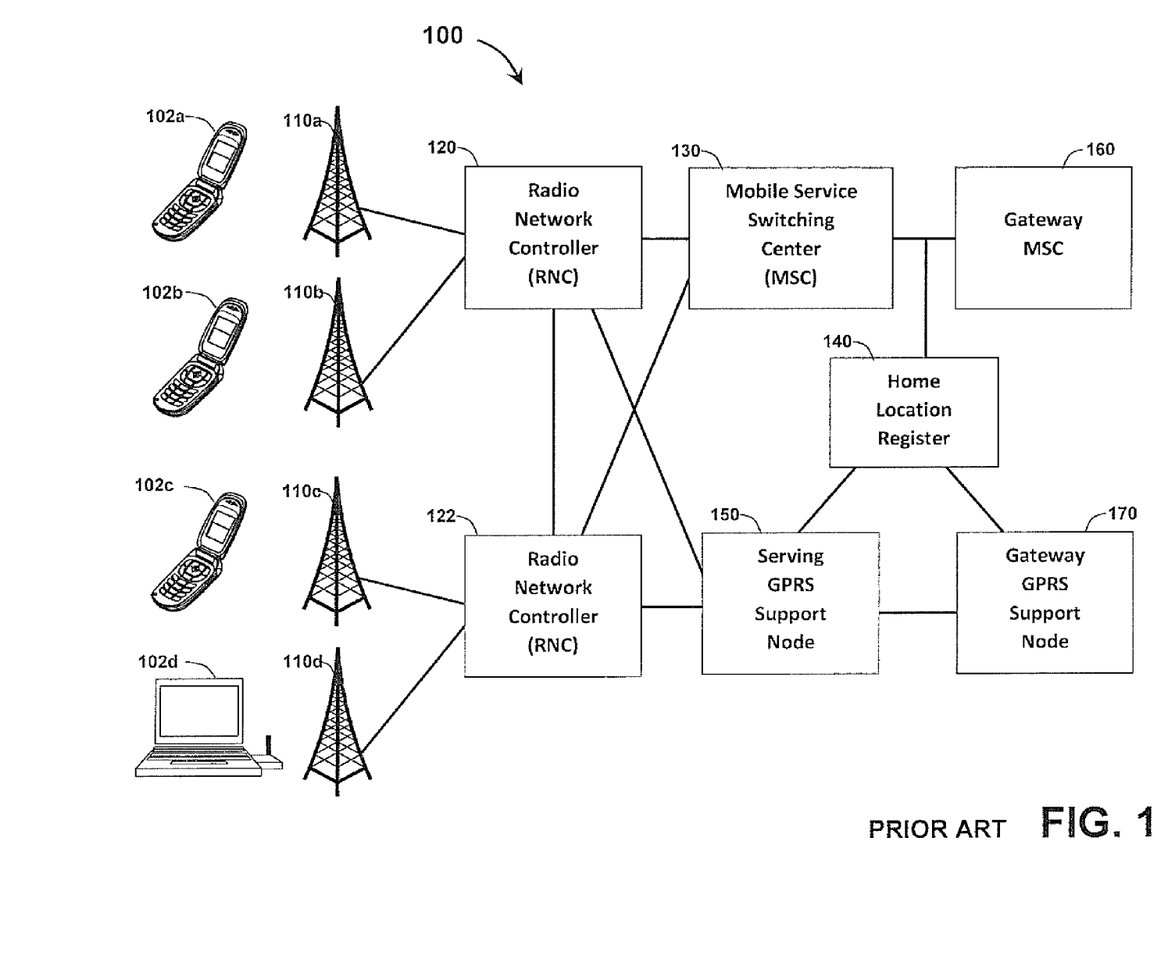
FIG. 1 illustrates an exemplary Universal Mobile Telecommunications Services (UMTS) network for providing various mobile services.

In use the invention is situated in a piece of network equipment (network element) which acts as a node in a network of network equipment. In FIG. 1 there may be seen a simplified block diagram 100 of a portion of a Universal Mobile Telecommunications Services (UMTS) network. Within this network may be found examples of network equipment such as Radio Network Controllers (RNCs) 120 and 122; Mobile Service Switching Centre (MSC) 130; Serving GPRS Support Node 150; Home Location Register Node 140, Gateway Mobile Switching Center 160; and Gateway GPRS Support Node 170. The Radio Network Controllers are connected to base stations 110, in FIG. 1 RNC 120 to NodeB base stations 110a and 110b; and RNC 122 to NodeB base stations 110c and 110d. NodeB base stations can be in radio contact with user equipment 102, depicted in FIG. 1 as handsets 102a, 102b, 102c, and computer equipment with radio connection 102d.

In operation the network elements communicate via connections which bind the individual network element to other network elements to form the overall network. The interfaces between network elements terminate on ports of each individual network element. According to the protocol of the specific network, particular messages are exchanged between network elements over the connections in order to accomplish various network functions such as setting up a call, handing off a connection, connecting a particular user equipment to a particular service, etc.

Figure 2:
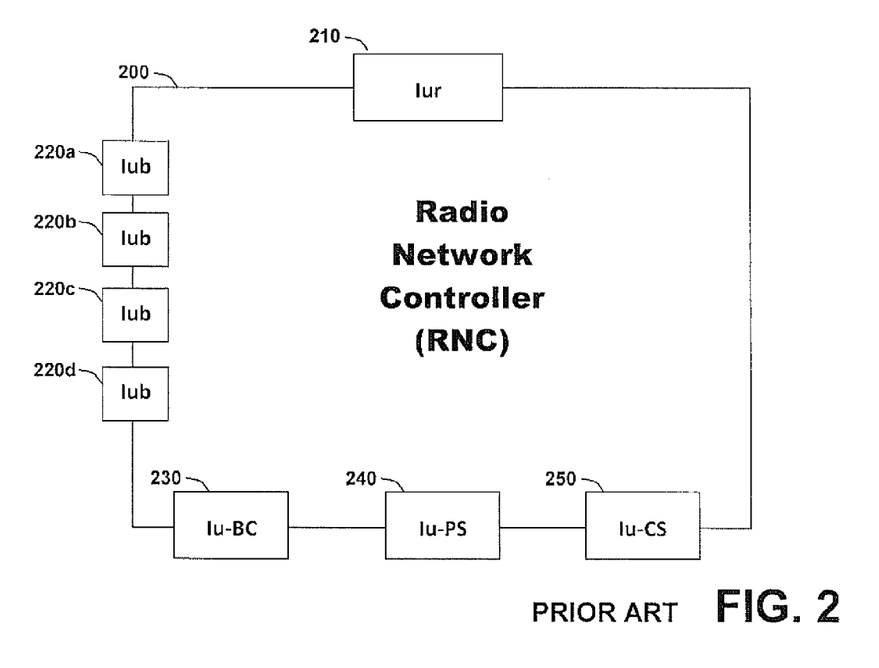
FIG. 2 illustrates an exemplary Radio Network Controller (RNC) with associated communication ports.

Referring now to FIG. 2 there may be seen a block diagram depicting the ports associated with an example Radio Network Controller network element 200 corresponding to references 120 and 122 of FIG. 1. As per the UMTS specification, RNC 200 has a plurality of ports by which it interfaces connections to other network elements. For the purposes of this explanation, the logical connections between network elements will be termed interfaces. The interface between RNCs, for example RNC 220 and RNC 222 of FIG. 1 is termed the Iur interface and may be seen on FIG. 2 as port 210 of RNC 200. The interface between the RNC and the NodeB units is termed the Iub interface and may be seen on FIG. 2 as ports 220a, 220b, 220c, and 220d of RNC 200. The interface between the RNC and a Cell Broadcast Center (CBC) is termed the Iu-BC interface and may be seen as port 230 of RNC 200. The interface between the RNC and the Serving GPRS Support Node (SGSN) is termed the Iu-PS interface as may be seen as port 240 of RNC 200. The interface between the RNC and the Mobile Switching Center is termed the Iu-CS interface as may be seen as port 250 of RNC 200. Messages over an interface are transmitted and received at ports and will be stored in port buffer memories as discussed regarding the next figure.

Figure 3:
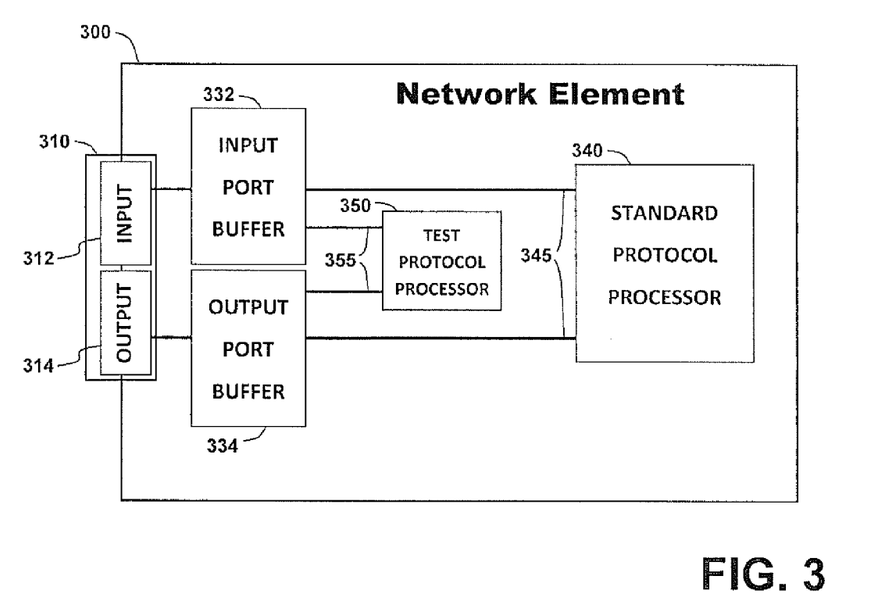
FIG. 3 illustrates an exemplary network element according to an embodiment of the invention.

Referring to FIG. 3 there may be seen a block diagram of an exemplary network element 300 according to an embodiment of the invention. Network element 300 has an interface port 310 having an input port 312 and output port 314. Messages arriving at interface input port 312 are stored in input port buffer 332. Likewise, messages destined for transmission from interface output port 314 are stored in output port buffer 334.

Standard protocol processor 340 is connected to input port buffer 332 and output port buffer 334 via connections 345. Standard protocol processor 340 represents the hardware and hardware-with-software components of the network element 300 which processes messages received at the interface ports according to a particular protocol to which the incoming messages correspond and which generates messages for transmission from the interface ports also according to a particular protocol to which the outgoing messages correspond.

Standard protocol processor 340 retrieves a message from input port buffer 332, processes the message according to protocol, by parsing the retrieved message to extract required fields and generating a response message (which may be for an interface port other than the interface port the message was received on), and places the response message into an output port buffer. If the outgoing message is for a second interface port other than a first interface port at which the message was received, then the output port buffer used will be the output port buffer associated with the second interface port.

Also connected to input port buffer 332 and output port buffer 334 via connections 355 is test protocol processor 350. Test protocol processor 350 represents the hardware and hardware-with-software components of the network element 300 which processes messages received at the interface ports and which generates messages for transmission from the interface ports according to the invention. Portions of the test protocol processor 350 may be coterminous with standard protocol processor 340, for example certain elements of hardware such as CPUs or memory may be commonly used by both protocol processors.

According to one embodiment of the invention, in operation test protocol processor 350 monitors input port buffer 332 and under certain conditions removes a message stored within input port buffer 332 prior to standard protocol processor 340 having retrieved it. Subsequently, test protocol processor 350 may replace the message with a failure path message as will be described in more detail below. In some embodiments test protocol processor 350 may replace the message after a delay; may alter the payload of the message and then replace the message; may alter the header of the message and then replace the message; or may not replace the message, effectively dropping the message.

The net result of each of these effects is to change the message flow to a failure path message flow and additionally to further change the message, either in contents or in terms of arrival time, in order to examine the response of either the network element 300, or the response of the larger network in which network element 300 is a node. The nature of these changes allows testing of the network element or the larger network in-situ with specifically prescribed failure path messages and specifically prescribed message compromising instances. These message compromising instances may be representative of, for example, network delays which may occur in the normal course of network operation.

According to one embodiment of the invention, test protocol processor 350 may replace a particular message in the port input buffer with a corresponding failure path message after a delay chosen from a random distribution of delay times. This random distribution may have a defined lower limit and a defined upper limit representative of the range of delays that could be incurred for messages arriving at this port. Further, the random distribution of delay times could be defined by some standard statistical distribution including a uniform random distribution, a truncated Normal random distribution, a truncated Poisson random distribution, or a truncated exponential random distribution.

Figure 4:
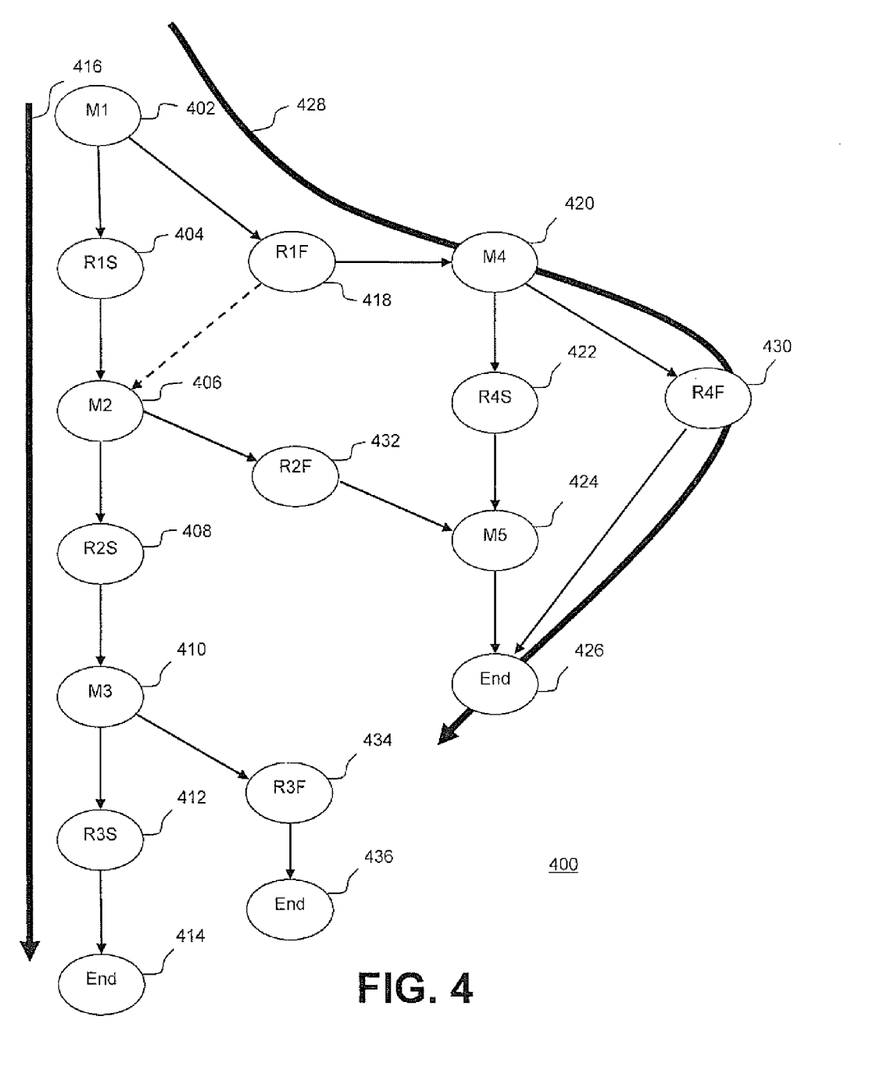
FIG. 4 illustrates a message flow diagram according to an embodiment of the present invention.

FIG. 4 depicts an exemplary generic message flow 400 of protocol messages exchanged between two network elements. With reference to FIG. 3 and to FIG. 4, during the course of establishing a communication service for example, specific messages need to be exchanged between the two network elements to successfully establish the communication service. These messages are received at input port 312, buffered in input port buffer 332 and parsed by standard protocol processor 340 as described previously. The response message is assembled by standard protocol processor 340 presented to output port buffer 334 for transmission by output port 314. Thus viewing the protocol message flow of FIG. 4 from the point of view of a single network element 300 in this example, the network element 300 might send message M1 (402) to initiate the service establishment process and expects to receive at input port buffer 332 through input port 312 from an external network element, a success path response message R1S (404), acknowledging the initiation request. In response to the received acknowledgement message, the network element 300 then sends message M2 (406) to continue the setup process. When the network element 300 receives another success path protocol message R2S (408), the process continues by the network element 300 transmitting message M3 (410), receiving success path response message R3S (412) and so forth until the protocol message sequence is completed at 414 and the communication service is successfully established. This successful flow of messages to complete the task, in this example, establishing a communication service, is referred to as a success path message flow 416.

In order to exercise various scenarios such as receiving incongruous, unexpected or invalid protocol messages that network element 300 might encounter in the real world, an embodiment of the present invention provides the ability to substitute a success path response protocol message received at input port buffer 332 with a failure path protocol message. This can be accomplished using a reroute library table. A generic reroute library table is shown in Table 1. The first column lists possible success path messages for a port on a network element. The second column lists corresponding failure path messages which could be substituted for the success path messages on the same row of the table. When an embodiment of the present invention is enabled, if a received success path message matches an entry in the first column of Table 1, it will be replaced by the corresponding failure path message found in the same row of the second column.

TABLE 1

| Success Path Message | Failure Path Message |
| --- | --- |
| R1S | R1F |
| R2S | R2F |
| R3S | R3F |
| R4S | R4F |

Thus in the example of FIG. 4, when the network element 300 receives success path response message R1S (404), test protocol processor 350 intercepts the incoming protocol message presented at input port buffer 332 before standard protocol processor 340 processes the message. Test protocol processor 350 removes success path response message R1S (404) from input port buffer 332 and replaces it with a corresponding failure path protocol message R1F (418). This message substitution is performed by test protocol processor 350 with the aid of a reroute library table. Standard protocol processor 340 then retrieves protocol message R1F (418) and processes it according to the protocol stack implemented in standard protocol processor 340. For example, standard protocol processor 340 might respond to failure path protocol message R1F (418) by transmitting an appropriate protocol message M4 (420) via output port buffer 334 and output port 314. An appropriate response from an external network element might be message R4S (422). Thus if network element 300 receives message R4S (422), test protocol processor 350 intercepts the incoming protocol message presented at input port buffer 332 before standard protocol processor 340 processes the message. Test protocol processor 350 removes success path response message R4S (422) from input port buffer 332 and replaces it a corresponding failure path protocol message R4F (430). In this example, the message sequence might end at this point (426). This message flow of protocol messages diverges from a success path 416 by introducing protocol messages in the protocol message exchange that diverges from a success path message flow and is termed as a failure path message flow 428.

The above description describes an embodiment of the invention operating on input port buffer 332 of network element 300 and the success path messages are inbound messages detected at the input port buffer 332 and the failure path messages substituted are messages inbound to the network element 300. Advantageously this embodiment provides the ability to exercise various failure path scenarios for network element 300. In the context of a laboratory test environment, network element 300 can be tested using a test system to simulate network conditions and executing predefined test cases in a controlled environment. Advantageously, this embodiment can also be used to exercise network element in-situ in a real-world network to determine if the network element can gracefully handle receiving incongruous, unexpected or invalid protocol messages in real-world conditions.

Embodiments of the present invention provide a self-disrupting network element wherein the network element itself can disrupt protocol messages received at the network element or transmitted from the network element. The embodiments facilitate the generation of various failure path messages to exercise the functioning of the network element when subjected to incongruous, unexpected or invalid protocol messages.

In operation the test protocol processor 350 is enabled as part of a testing scenario. The enabling could be via specific operator instructions or automatically in response to an automatic test routine. As per normal network test procedures, responses of the network element 300 and interacting network elements would be captured in a trace file and logged in a database for later analysis.

In some embodiments of the invention, functionality of the test protocol processor 350 can be enabled for testing purposes and then disabled before delivery to a customer. In other embodiments the functionality can be enabled for use by a customer in a deployed communication network.

In some embodiments, the reroute library table is configured to enable/disable specific rows such that when a success path message is received at the port buffer which matches a success path message in the table and the corresponding row is enabled, message substitution takes place and if the row is disabled, the test protocol processor takes no action and the standard protocol processor handles the received message normally.

In another embodiment of the invention, test protocol processor 350 operates on output port buffer 334 and the test protocol processor 350 substitutes or removes the protocol message from output port buffer 334 prior to transmission of the protocol message from the port 314. In this embodiment, Table 1 would reflect outgoing messages from network element 300, thus outbound success path messages would be detected at the output port buffer 334 and substituted with corresponding outbound failure path messages. Advantageously this embodiment provides the ability to exercise various failure path scenarios for an external network element in communication with network element 300 via a port on network element 300. In the context of a laboratory test environment, a test system can execute predefined test cases in a controlled environment while network element 300 can be used to introduce unexpected protocol messages into the protocol message flow to simulate network impairments and other network conditions. Advantageously, this embodiment can also be used to exercise an external network element in-situ in a real-world network to determine if the external network element can gracefully handle receiving incongruous, unexpected or invalid protocol messages in real-world conditions. As per normal network test procedures, responses of external network element and network element 300 would be captured in a trace file and logged in a database for later analysis.

In other embodiments of the invention, test protocol processor 350 operates on multiple input and/or output buffers. A reroute library table can be implemented for each interface port of any network element handling protocol messages. Thus for the RNC of FIG. 2, a reroute library table can be implemented for each of the ports Iur (210), Iub (220a), Iub (220b), Iub (220c), Iub (220d), Iu-PS (240), IU-CS (250). For UMTS/3GPP networks, a reroute library table can also be implemented for each of the ports of other network elements such as User Equipment (UE), Node Bs, Mobile Service Switching Centers (MSC), Gateway GPRS Support Nodes, Gateway MSCs, etc. Additionally, a reroute library table can be implemented for input port buffer and/or for an output port buffer for each interface port.

Examples of network technologies using protocol messaging and suitable for application of the present invention include Cdma2000, UMTS and LTE.

Table 2 illustrates an example of a reroute table for an embodiment of the invention directed to handling inbound Radio Resource Control (RRC) protocol messages at an Iub interface of a UMTS Radio Network Controller (RNC).

TABLE 2

| Success Path Message Inbound at Iub interface of RNC | Substitute Failure Path Message Inbound at Iub interface of RNC |
|---|---|
| MEASUREMENT REPORT | MEASUREMENT CONTROL FAILURE |
| PHYSICAL CHANNEL RECONFIGURATION | PHYSICAL CHANNEL RECONFIGURATION FAILURE |
| RADIO BEARER RECONFIGURATION COMPLETE | RADIO BEARER RECONFIGURATION FAILURE |
| RADIO BEARER RELEASE COMPLETE | RADIO BEARER RELEASE FAILURE |
| RADIO BEARER SETUP COMPLETE | RADIO BEARER SETUP FAILURE |
| SECURITY MODE COMPLETE | SECURITY MODE FAILURE |
| TRANSPORT CHANNEL RECONFIGURATION COMPLETE | TRANSPORT CHANNEL RECONFIGURATION FAILURE |
| UTRAN MOBILITY | UTRAN MOBILITY INFORMATION |

TABLE 2-continued

| Success Path Message Inbound at Iub interface of RNC | Substitute Failure Path Message Inbound at Iub interface of RNC |
|---|---|
| INFORMATION CONFIRM | FAILURE |
| HANDOVER FROM UTRAN COMPLETE | HANDOVER FROM UTRAN FAILURE |
| ACTIVE SET UPDATE | ACTIVE SET UPDATE FAILURE |

Table 3 illustrates an example of a reroute table for an embodiment of the invention directed to handling outbound Radio Resource Control (RRC) protocol messages at an Iub interface of a UMTS Radio Network Controller (RNC).

TABLE 3

| Success Path Message Outbound at Iub interface of RNC | Substitute Failure Path Message Outbound at Iub interface of RNC |
|---|---|
| RRC CONNECTION SETUP | RRC CONNECTION REJECT |
| RADIO BEARER SETUP | SIGNALLING CONNECTION RELEASE |
| RADIO BEARER RECONFIGURATION | SIGNALLING CONNECTION RELEASE |
| PAGING TYPE 2 | RRC CONNECTION RELEASE |

After detecting a success path message at the port which has a matching entry in the first column of the reroute library table test protocol processor 350 parses the success path message to extract fields required to build the corresponding failure path message. In the case of 3GPP protocol messages the following fields are captured: Logical_channel_type, MessageType, rrc_TransactionIdentifier, integrityProtectionModeInfo.

The described embodiments simulate the introduction of unexpected protocol messages from an external source to the network element under test into the protocol message flow which can be advantageous in a testing scenario in which it is desired to exercise the functioning of the network element when subjected to incongruous, unexpected or invalid protocol messages to verify the robustness of network elements to determine if the network elements can gracefully handle receiving incongruous, unexpected or invalid protocol messages.

Figure 5:
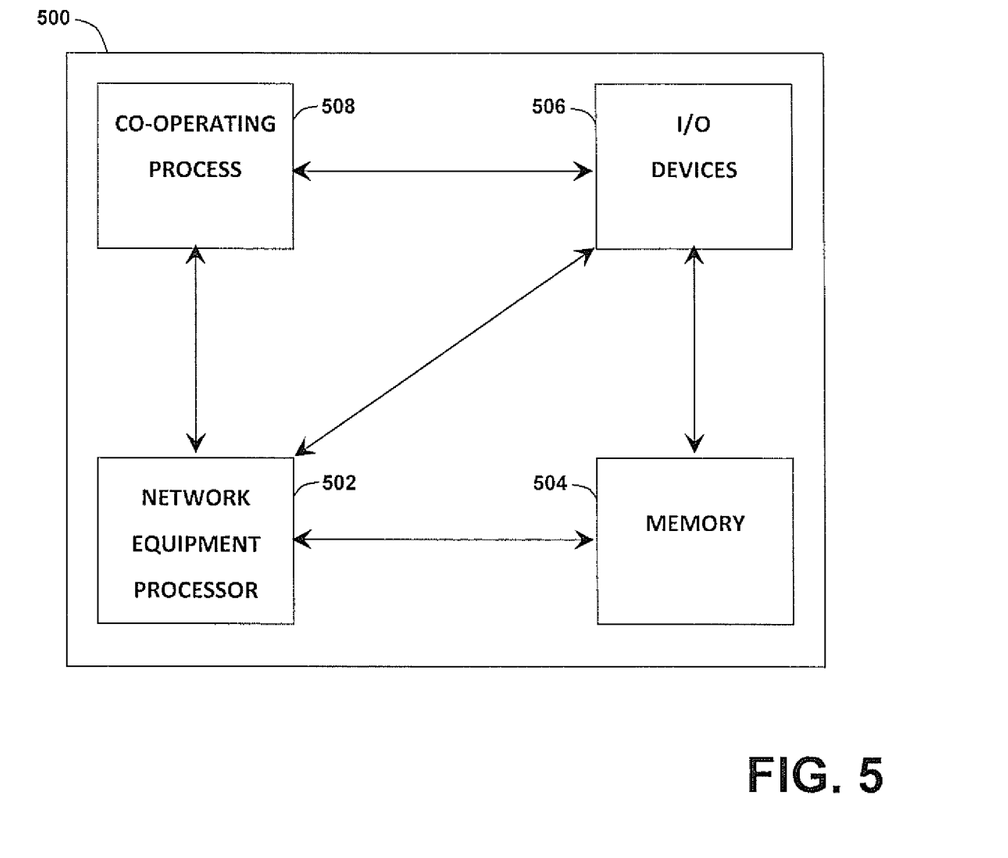
FIG. 5 illustrates an exemplary network element protocol processor assembly according to an embodiment of the invention.

FIG. 5 depicts a high-level block diagram of a network element protocol processor assembly suitable for use in performing functions described herein.

As depicted in FIG. 5, network element protocol processor assembly 500 includes a network element processor 502 (e.g., a central processing unit (CPU) and/or other suitable processor(s)), a memory 504 (e.g., random access memory (RAM), read only memory (ROM), and the like), a cooperating module/process 508, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 508 can be loaded into memory 504 and executed by network element protocol processor 502 to implement the functions as discussed herein. As well, cooperating process 508 (including associated data structures) can be stored on a tangible, non-transitory computer readable storage medium, for example magnetic or optical drive or diskette, semiconductor memory and the like.

It is contemplated that some of the steps discussed herein as methods may be implemented within hardware, for example, as circuitry that cooperates with the network element protocol processor to perform various method steps. Portions of the functions/elements described herein may be implemented as a computer program product wherein computer instructions, when processed by a network element processor, configure the operation of the network element processor such that the methods and/or techniques described herein are invoked or otherwise provided. Instructions for invoking the inventive methods may be stored in fixed or removable media, and/or stored within a memory within a computing device operating according to the instructions. It is to be understood that various changes in the details, materials, and arrangements of the parts which have been described and illustrated in order to explain the nature of this invention may be made by those skilled in the art without departing from the scope of the invention as expressed in the following claims.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." Numerous modifications, variations and adaptations may be made to the embodiment of the invention described above without departing from the scope of the invention, which is defined in the claims.

What is claimed is:

1. A network element comprising:
   a port having a port buffer;
   a standard protocol processor which processes messages stored in said port buffer; and
   a test protocol processor having access to said port buffer, wherein said test protocol processor is configured to remove a first protocol message from said port buffer and replace said removed first protocol message in the port buffer with a corresponding failure path protocol message after a time delay.

2. The network element of claim 1, wherein said failure path protocol message diverts protocol message flow from a prescribed success path message flow.

3. The network element of claim 1, wherein said test protocol processor replaces said removed first protocol message in said port buffer after altering payload contents of said failure path protocol message.

4. The network element of claim 3, wherein said protocol messages comprise Universal Mobile Telecommunications System (UMTS) protocol messages.

5. The network element of claim 1, wherein said port buffer comprises an input port buffer of said network element and said test protocol processor replaces said removed first protocol message prior to said standard protocol processor processing said first protocol message.

6. The network element of claim 1, wherein said port buffer comprises an output port buffer of said network element and said test protocol processor replaces said removed first protocol message prior to transmission of said failure path protocol message from said port.

7. A method performed by a test protocol processor in a network element having a port buffer, a standard protocol processor which processes messages stored in said port buffer, wherein said test protocol processor has access to said port buffer, said method comprising;
  removing a first protocol message from said port buffer; and
  replacing said removed first protocol message in the port buffer with a corresponding failure path protocol message after a time delay.

8. The method of claim 7, wherein said failure path protocol message diverts protocol message flow from a prescribed success path message flow.

9. The method of claim 7, wherein said test protocol processor replaces said removed first protocol message in said port buffer after altering payload contents of said failure path protocol message.

10. The method of claim 7, wherein said protocol messages comprise Universal Mobile Telecommunications System (UMTS) protocol messages.

11. The method of claim 7, wherein said port buffer comprises an input port buffer of said network element and said test protocol processor replaces said removed first protocol message prior to said standard protocol processor processing said first protocol message.

12. The method of claim 7, wherein said port buffer comprises an output port buffer of said network element and said test protocol processor replaces said removed first protocol message prior to transmission of said failure path protocol message from said port.

13. A tangible and non-transitory machine-readable storage medium encoded with instructions thereon for execution by a test protocol processor on a port buffer of a telecommunication network element having a standard protocol processor, wherein the tangible and non-transitory machine-readable storage medium comprises:
  instructions for removing a first protocol message from said port buffer; and
  instructions for replacing said removed first protocol message in the port buffer with a corresponding failure path protocol message after a time delay.

14. The tangible and non-transitory machine-readable storage medium claimed in claim 13, wherein said instructions configure the operation of said test protocol processor such that said failure path protocol message diverts protocol message handling at said standard protocol processor from a prescribed success path message flow.

15. The tangible and non-transitory machine-readable storage medium claimed in claim 13, wherein said instructions configure the operation of said test protocol processor such that said test protocol processor replaces said removed first protocol message in said port buffer after altering the payload contents of said failure path protocol message.

16. The tangible and non-transitory machine-readable storage medium claimed in claim 13, wherein said instructions configure the operation of said test protocol processor such that said protocol messages comprise Universal Mobile Telecommunications System (UMTS) protocol messages.

17. The tangible and non-transitory machine-readable storage medium claimed in claim 13, wherein said instructions configure the operation of said test protocol processor such that said port buffer comprises an input port buffer of said network element and said test protocol processor replaces said removed first protocol message prior to said standard protocol processor processing said first protocol message.

18. The tangible and non-transitory machine-readable storage medium claimed in claim 13, wherein said instructions configure the operation of said test protocol processor such that said port buffer comprises an output port buffer of said network element and said test protocol processor replaces said removed first protocol message prior to transmission of said failure path protocol message from said port.

\* \* \* \* \*